(12) United States Patent
Rameau

(10) Patent No.: US 10,409,921 B2
(45) Date of Patent: Sep. 10, 2019

(54) DESIGNING INDUSTRIAL PRODUCTS BY USING GEOMETRIES CONNECTED BY GEOMETRICAL CONSTRAINTS

(71) Applicant: Dassault Systemes, Velizy Villacoublay (FR)

(72) Inventor: Jean-Francois Rameau, Lisses (FR)

(73) Assignee: Dassault Systemes, Velizy Villacoublay (FR)

( * ) Notice: Subject to any disclaimer, the term of this patent is extended or adjusted under 35 U.S.C. 154(b) by 766 days.

(21) Appl. No.: 14/661,533

(22) Filed: Mar. 18, 2015

(65) Prior Publication Data
US 2015/0269286 A1 Sep. 24, 2015

(30) Foreign Application Priority Data

Mar. 19, 2014 (EP) .................................... 14305389

(51) Int. Cl.
*G06F 17/50* (2006.01)
(52) U.S. Cl.
CPC .......... *G06F 17/50* (2013.01); *G06F 2217/02* (2013.01)
(58) Field of Classification Search
CPC ............................. G06F 17/50; G06F 2217/02
USPC ............................................................ 703/1
See application file for complete search history.

(56) References Cited

U.S. PATENT DOCUMENTS

| 5,251,290 | A |   | 10/1993 | Pabon |              |
|-----------|---|---|---------|-------|--------------|
| 5,452,238 | A | * | 9/1995  | Kramer | G06F 17/5086 |
|           |   |   |         |       | 345/419      |
| 5,617,510 | A |   | 4/1997  | Keyrouz et al. | |
| 6,233,351 | B1| * | 5/2001  | Feeney | G06K 9/00416 |
|           |   |   |         |       | 345/522      |
| 6,898,560 | B1| * | 5/2005  | Das    | G06F 17/50   |
|           |   |   |         |       | 703/22       |
| 7,623,139 | B1| * | 11/2009 | Gifford | G06F 17/5086 |
|           |   |   |         |       | 345/619      |

(Continued)

FOREIGN PATENT DOCUMENTS

EP    1939771 A1    7/2008

OTHER PUBLICATIONS

EP Search Report for European Application No. 14305.389.0, filed Mar. 19, 2014 entitled *"Designing Industrial Products by Using Geometries Connected by Geometrical Constraints"*.

(Continued)

*Primary Examiner* — Juan C Ochoa
(74) *Attorney, Agent, or Firm* — Hamilton, Brook, Smith & Reynolds, P.C.

(57) ABSTRACT

The invention notably relates to a computer-implemented method of design of an industrial product wherein constraints between geometries of the industrial product are modeled with a graph of constraints comprising nodes and edges, a node representing a geometry and an edge representing a constraint between two geometries. The method comprising the steps of selecting at least one geometry of the product; computing a depth value of each node of the graph from a node representing the at least one selected geometry; identifying antagonistic constraint(s) in the graph, an antagonistic constraint being represented by an oriented edge wherein the depth value of the start node is larger to the depth value of the end node; reversing the identified antagonistic constraint(s); modifying the at least one selected geometry.

20 Claims, 6 Drawing Sheets

(56) References Cited

U.S. PATENT DOCUMENTS

| | | | |
|---|---|---|---|
| 7,639,267 B1* | 12/2009 | Desimone | G06F 17/5086 |
| | | | 345/420 |
| 8,248,407 B2* | 8/2012 | Deslandes | G06F 17/5086 |
| | | | 345/420 |
| 9,117,308 B1* | 8/2015 | Nag | G06F 17/50 |
| 2008/0172208 A1* | 7/2008 | Lechine | G06F 17/50 |
| | | | 703/1 |

OTHER PUBLICATIONS

Hsu, C., et al., "A Constraint-based manipulator toolset for editing 3D objects," Proceedings of the Fourth Symposium on Solid Modeling and Applications, Atlanta, GA, May 14-16, 1997.

Office Action/Search Report from Application No. CN201510278001.7, "Designing Industrial Products by Using Geometries Connected by Geometrical Constraints," dated Jan. 25, 2019.

* cited by examiner

DESIGNING INDUSTRIAL PRODUCTS BY USING GEOMETRIES CONNECTED BY GEOMETRICAL CONSTRAINTS

RELATED APPLICATION

This application claims priority under 35 U.S.C. § 119 or 365 to European, Application No. 14305389.0, filed Mar. 19, 2014. The entire teachings of the above application are incorporated herein by reference.

FIELD OF THE INVENTION

The invention relates to the field of computer programs and systems, and more specifically to a method, system and program of designing an industrial product wherein constraints between geometries of the industrial product are modeled with a graph of constraints comprising nodes and edges.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In a CAD system, geometrical constraints connecting geometries forming an industrial product are oriented. The orientation of a constraint between two geometries means that one geometry is the master and that the other geometry is the slave element. For example, when creating a matching constraint between surface A and surface B, surface B is unchanged while surface A is deformed in order to fit the boundary edge of surface B. The creation order is saved by the system and modification must be done according to this order. In the example, it is not possible to deform surface B up to a modified version of surface A.

Orienting constraints at the creation step is actually appropriate because the result clearly depends on the selection order. Thus, the CAD system behaves in a predictable way, which is good for usability.

Nevertheless, for modification purposes, the orientation of the constraint makes it difficult to understand which objet must be edited in order to fit the design intent.

Furthermore, at modification step, the constraint orientation is not "visible" on the geometry. This is because geometries such as curves and surfaces styling constraints (coincidence, matching, smoothness connection etc.) are not naturally associated with arrows like offset constraints of mechanical design.

The usual way for the designer to understand the orientation of a constraint is to try modifying the geometry in order to find out who the master is and who the slave is. Once this is done, the designer iterates changes on the master element until the slave element behaves according to the design intent because the slave element cannot be edited directly.

Depending on constraint's types, some orientations can be reversed by hand, which makes the change process easier, but not as fluent as it should be for productivity purpose. In short, the behavior of the CAD system is governed by the constraints network orientation rather than the modification intent.

Another problem is that the designer is allowed to create cycles of oriented constraints. From a theoretical point of view, a cycle is a never-ending dependency between two or more elements. The existence of a solution is not guaranteed a priori and the computation of a solution may require an iterative process, thus raising a convergence issue. From the user's point of view, and in the context of curves and surfaces styling design, a cycle of constraints is an interactive selection side effect rather than actual design intent. A known solution for dealing with cycles consists in providing suggestions to the user (e.g. by displaying alphanumeric messages) for allowing the user to decide whether (or not) to follow the suggestions. With such a solution, modifying a constrained set of geometrical objects is a question of tuning the constraints network under warning messages. The CAD system does not change constraint orientation by itself, and this solution is not efficient if the preferred style of interface is to interactively and fluently move of deform geometrical objects.

Within this context, there is still a need for an improved method for designing an industrial product wherein constraints between geometries are oriented.

SUMMARY OF THE INVENTION

It is therefore provided a computer-implemented method of design of an industrial product wherein constraints between geometries of the industrial product are modeled with a graph of constraints comprising nodes and edges, a node representing a geometry and an edge representing a constraint between two geometries. The method comprises the steps of:
  selecting at least one geometry of the product;
  computing a depth value of each node of the graph from a node representing the at least one selected geometry;
  identifying antagonistic constraint(s) in the graph, an antagonistic constraint being represented by an oriented edge wherein the depth value of the start node is larger to the depth value of the end node;
  reversing the identified antagonistic constraint(s);
  modifying the at least one selected geometry;
  propagating the modification of the selected geometry.
The method may comprise one or more of the following:
  the propagation of the modification of the selected geometry comprises solving the geometries according to the constraints modeled in the graph of constraints in accordance with the modification of the at least one selected geometry, the solving being performed according to a sequence order that is defined by the computed depth values;

the nodes having the same depth value are grouped and the sequence order for solving the constraints between geometries comprises, for a group of nodes having a depth value n+1, solving the geometries according to constraints represented by edges connecting the nodes of the group, solving the geometries according to constraints oriented from nodes of a group of nodes having a depth value n toward nodes of the group of node having a depth value n+1;

constraints between geometries of the group of nodes having a depth value n are solved;

after the step of computing a depth value of each node of the graph, a step of determining the orientation of each edge of the graph from the node(s) having the lowest depth value to the node(s) having the highest depth value;

an edge connecting two nodes having the same depth value is kept unchanged;

after the step of selecting at least one geometry of the product, a step of selecting at least one reference element, wherein a reference element is a geometry of the product that keeps unmodified at the propagating step;

the at least one selected reference element and the at least one selected geometry have the same depth value that is the lowest depth value of the graph;

after the step of propagating the modification of the selected geometry, a step of restoring original orientations of the identified antagonistic constraint(s) reversed;

the geometries represented by the nodes are one among a point, a line, a curve, a surface, a place, a solid.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
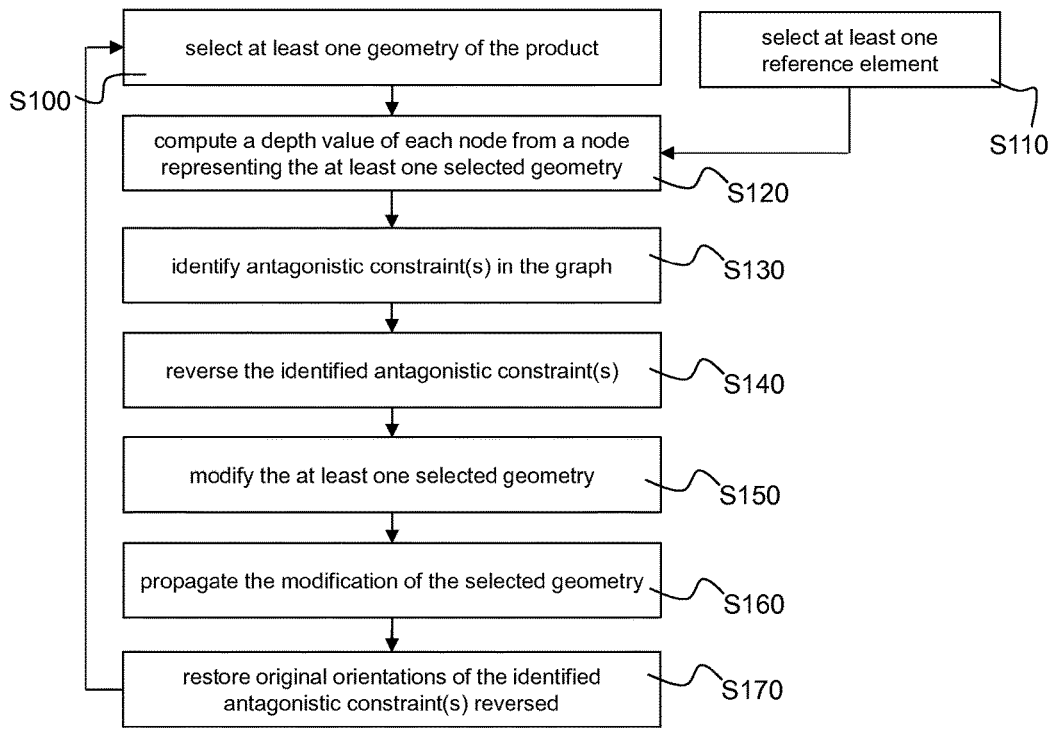
FIG. 1 shows a flowchart of an example of the method.

With reference to the flowchart of FIG. 1, it is proposed a computer-implemented method of design of an industrial product wherein constraints between geometries of the industrial product are modeled with a graph of constraints. The graph of constraints comprises nodes and edges, a node representing a geometry of the industrial product and an edge representing a constraint between two geometries of the industrial product. The method comprises the selection of at least one geometry of the industrial product. The method further comprises computing, for each node of the graph, a depth value from the node representing the geometry previously selected. Then, the method comprises identifying one or more antagonistic constraint(s) in the graph. An antagonistic constraint is defined by an oriented edge wherein the depth value of the start node is larger to the depth value of the end node. The method also comprises reversing the one or more identified antagonistic constraint(s); said otherwise, the orientation of the one or more identified antagonistic constraint(s) is inversed. The method further comprises modifying the at least one selected geometry, e.g. upon user action. The method also comprises propagating the modification of the selected geometry on one or more other geometry of the industrial product.

Such a method improves the design of an industrial product wherein constraints between geometries are oriented as the invention gives the priority to the modification intent by automatically reversing antagonistic constraints. Indeed, given a set of constrained geometries, given a set of user selected elements that are intended to be modified and given an optional set of reference elements, the invention computes a depth value of all geometrical elements with respect to the user selection and to the reference elements and, thanks to this depth value, determines antagonistic constraints. Then, orientations of antagonistic constraints are reversed so that when the modification is actually performed by the designer, it is propagated across constraints network that is oriented in accordance with the design intent. Furthermore, orientations are computed in such a way that reference elements are not modified. After the modification is done, original orientations of antagonistic constraints are restored, and a new selection of geometrical elements is allowed, running another reorientation process according to said new selection.

Hence, thanks to the invention, the constraints orientations are hidden to the designer so that the modification is performed directly, without manually reorienting constraints or searching master/slave settings. This makes the geometrical product easily modified by the original designer or by another designer who is not the author of the initial version. The modification is even easier because the system features a natural behaviour by conciliating the initial design intent, the (optional) reference elements and the instantaneous modification intent. In turn, time is saved at modification step; productivity is enhanced, which makes the final product available in a shorter time. Furthermore, the present invention makes it possible the solving of cycles of constraints in the graph. Indeed, cycles of constraints that involve geometries having different depth values are removed by reversing antagonistic constraints. In other words, the user selection temporarily induces a priority among geometrical elements so that many cyclic dependencies are removed. Not all cycles are removed by this process, but those that continue to exist are not relevant. The solvers can therefore solve the constraints that belonged to the relevant cycles. Computing resources are thus saved up because the solvers no more stall while trying to solve constraints cycles. Another advantage of the present invention is that the initial orientation of antagonistic constraints can be easily restored after the propagation of the modification of the selected geometry is done. This saves the initial design intent making the overall process more robust by avoiding divergence of the data model.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of selecting geometry of the product may be performed upon user action, e.g. the user performs the selection on a displayed representation of the geometry. Similarly, the step of modifying the selected geometry may be performed upon user action.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the industrial product may be stored on a database. The graph of constraints modeling constraints between geometries of the industrial product may be stored on the database.

The method generally manipulates modeled objects. A modeled object is any object defined by data stored in the database. For instance, in the present invention, an industrial product is designed using modeled objects that may be geometries such as curves and surfaces. The geometries are connected by geometrical constraints. The geometrical constraints may be, but not limited to, tangency, matching, connecting surfaces, end point coincidence, connection smoothness, . . . .

By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system adapted at least for designing a modeled object on the basis of a graphical representation of the modeled object. CATIA is an example of CAD system. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 13:
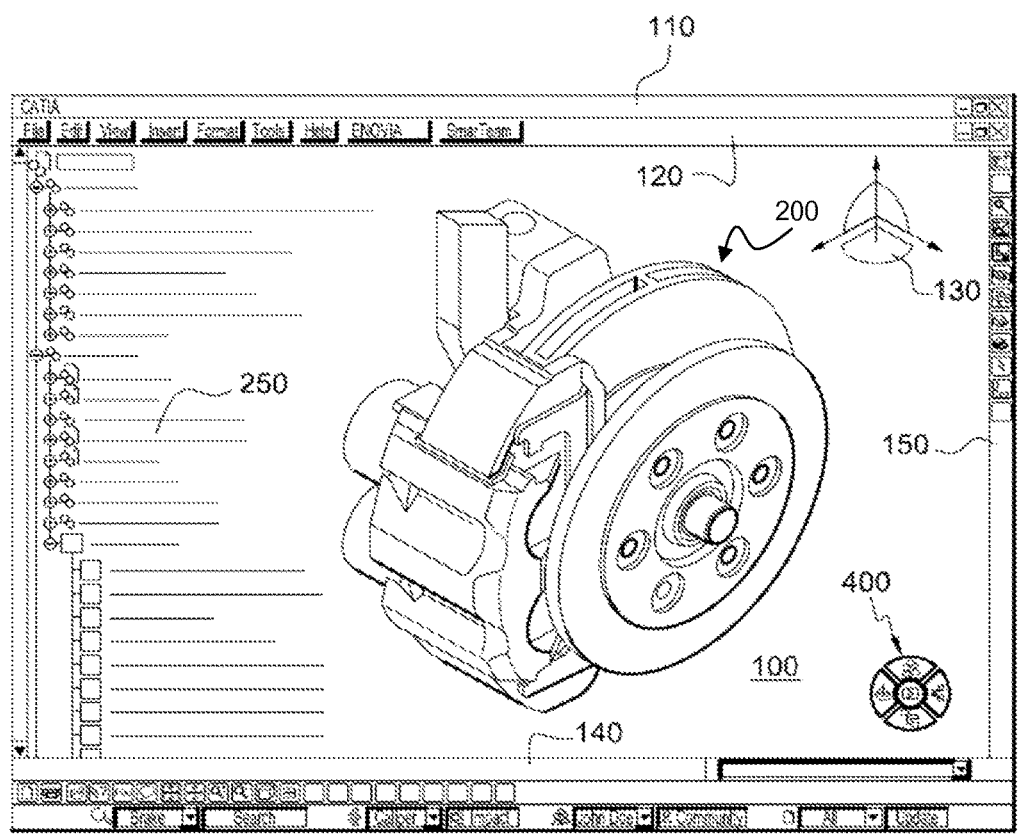
FIG. 13 shows an example of a graphical user interface of the CAD system.

FIG. 13 shows an example of the GUI of the system, wherein the system is a CAD system.

The GUI 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art. Some of these icons are associated with software tools, adapted for editing and/or working on the 3D modeled object 200 displayed in the GUI 100. The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 250 related to the displayed product 200. In the example of FIG. 13, the data 250, displayed as a "feature tree", and their 3D representation 200 pertain to a brake assembly including brake caliper and disc. The GUI may further show various types of graphic tools 130 for example for facilitating 3D orientation of the object, for triggering a simulation of an operation of an edited product or render various attributes of the displayed product 200. A cursor (not represented) may be controlled by a haptic device to allow the user to interact with the graphic tools.

Figure 14:
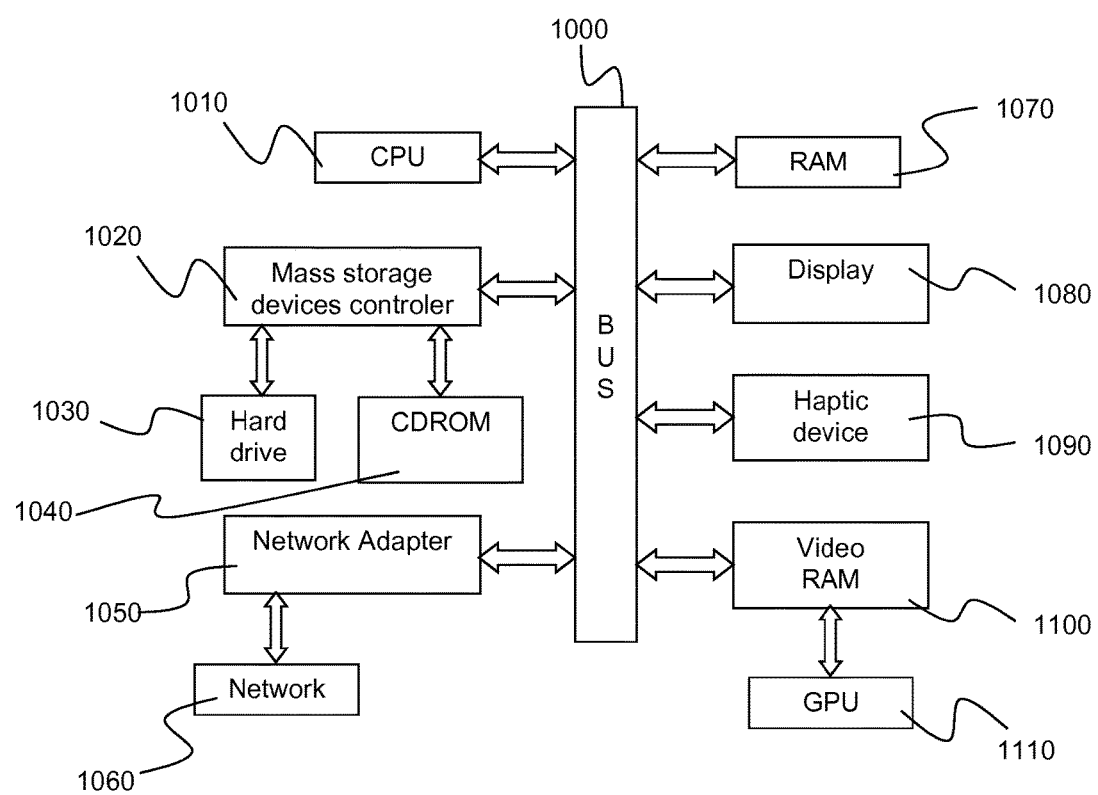
FIG. 14 shows an example of a computer system for performing the method according to the invention.

FIG. 14 shows an example of a computer system for performing the method, wherein the system is a client computer system.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing an industrial product" designates any action or series of actions which is at least part of a process of elaborating a modeled object, e.g. a 3D modeled object. Thus, the method may comprise creating the industrial product from scratch. Alternatively, the method may comprise providing industrial product previously created, and then modifying the industrial product.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a mechanical product, such as a part, or an assembly of parts. Because the method improves the design of the modeled object, the method also improves the manufacturing of a product and thus increases productivity of the manufacturing process.

A CAD software solution allows the design of industrial products in various and unlimited industrial fields: aerospace, architecture, construction, consumer goods, high-tech devices, industrial equipment, transportation, marine, offshore or transportation.

Referring back to FIG. 1, at step S100, one or more geometries of an industrial product are selected.

The industrial product is a modeled object represented with a set of geometries. The term geometry means entity used for representing the model. In practice, the model is represented using geometries such lines, curves, faces or surfaces. Constraints between geometries may be used for associating geometries together, e.g. for specifying a fixed location or angle. The constraints between the geometries of the product are modeled with a graph of constraints comprising nodes and edges. A node of the graph represents a geometry of the product, and an edge between two nodes represents a constraint between the two geometries represented by their respective node. The term graph means a representation of a set of node where some pairs of nodes are connected by edges (also referred to as links). A geometry represented by a node may be one among a point, a line, a curve, a surface, a place, a solid.

Formally, a network of geometries and constraints is modeled by a directed graph of constraints $G=(X,U,\alpha,\omega)$ where X is the set of nodes, U is the set of arcs and where $\alpha:U \rightarrow X$ and $\alpha:U \rightarrow X$ are the connections function. Expression $\alpha(u)=x$ means that $x \in X$ is the initial node of arc $u \in U$ and $\omega(u)=y$ means that $y \in X$ is the end node of arc $u \in U$. Nodes of X symbolize geometrical objects (also referred to as geometries) and arcs of U symbolize constraints. Constraints orientations are captured by arcs orientations. The initial node $\alpha(u)$ is the master element of constraint u, and the end node $\omega(u)$ is the slave element of constraint u. Notation $\omega^{-1}(x)$ is the set of all arcs u such that $\omega(u)=x$. Notation $\alpha(\omega^{-1}(x))$ is the set of all nodes y connected to node x by an oriented arc from y to x. Notation $\alpha^{-1}(x)$ is the set of all arcs u such that $\alpha(u)=x$. Notation $\omega(\alpha^{-1}(x))$ is the set of all nodes y connected to node x by an oriented arc from x to y. The model handles non oriented constraints through double arcs featuring reverse orientations. The graph G may include cycles.

The selection of a geometry may be performed upon user action on the representation of the geometry displayed to the user, as known in the art. For instance, the user can use a haptic device of the system exemplified on FIG. 14 for acting on one of the geometry the industrial product displayed in the GUI represented on FIG. 13.

Alternatively, the selection of a geometry may be automatically carried out by the system, e.g. the system selects the last edited geometry. It is to be understood that the selection may rely on both successive user actions and automatic selections.

Figure 2:
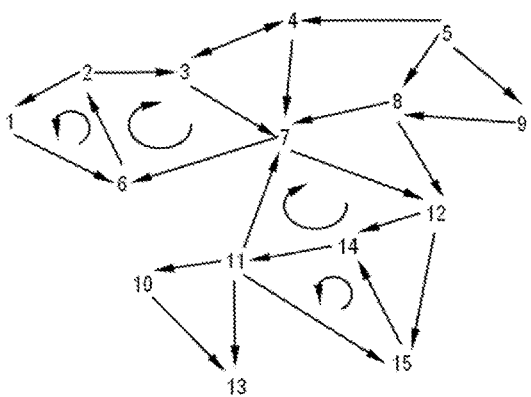
FIG. 2 shows an example of a directed graph or graph of constraints.

Referring now to FIG. 2, it is shown an example of a graph of constraints. In this graph, $X=\{1, \ldots, 15\}$, which means that the graph comprises fifteen nodes. The arrow between two nodes represents the constraints. The arrowhead is on the slave, while the arrow starts from the master. For instance, the node 8 is connected to the node 7 with an oriented edge (represented by an arrow) that starts from the node 8 and arrives at the node 7: the node 8 is the master and the node 7 is the slave. In the event a constraint between two nodes is not oriented, the edge is represented by a double arrow—for instance the geometries represented by the nodes 3 and 4 are constrained with a non-oriented constraint. The graph of constraints features four cycles, respectively the cycles comprising the nodes (1, 2, 6), (2, 3, 7, 6), (7, 12, 14, 11), (14, 11, 15).

Back to FIG. 1, at step S110, at least one reference element is selected. The expression reference element means a geometry of the product that keeps unmodified, that is, the user cannot modify this geometry. In practice, reference elements are used for design situations wherein the reference element is shared with another designer who is the owner of the said element. In order to keep reference elements unchanged through the constraints reorientation process, reference elements are systematically included in the set of user selected objects, as it will be explained in the following.

The selection of one or more reference element can be performed in the same way as explained for the selection of a geometry of the product. In practice, the reference elements are automatically selected, the identification of what reference elements to be selected being performed according to a former user selection.

Then, at step S120, a depth value of each node of the graph is computed, the computation being performed from the node representing the selected geometry. The depth value of a node is modeled by a mapping $p: X \rightarrow \mathbb{N}$ meaning that p(x) is the depth value of node x, where X is the set of nodes of the graph of constraints. Depth value is an integer number. The depth value of a node is used to represent the "distance" of the node from a starting node when traversing the graph. The distance may be, but is not limited to, the number of nodes of the graph that are met when traversing the graph from the starting node to the arrival node. The traversal of the graph may be performed according to the following algorithm.

Let $S' \subset X$ be the set of selected nodes at step S100 and $R \subset X$ the (possibly empty) set of reference elements selected at step S110. Let $S := S' \cup R$ be the set of selected elements including user selected elements and reference elements. Starting from nodes S, the depth value is computed for all nodes $x \in X$ according to the following principle:

(i) the depth value of the selected nodes of S is set to "0"; hence, the selected reference element(s) and geometry(ies) have the same depth value that is the lowest depth value of the graph;

(ii) an unvisited node that is incident to node having a depth value n has a depth value n+1. A node is incident to a selected node when both nodes are connected by an edge.

During the depth value computation, edge orientations are not taken into account for incidence searching. Thus, a node that is incident to a selected node of S has depth value "1". A node that is incident to a depth value "1" node has depth value "2", a node that is incident to a depth value "2" node has depth value "3", and so on.

The very first depth value is a symbolic "−1" for all nodes in order to recognize unvisited nodes during the graph traversal.

For all x ∈ X do begin
   p(x) := −1
End for

Next step is to set a zero depth value to all selected nodes, that is, the one or more nodes selected at step S100 and at step S110 (if any).

For all x ∈ S do begin
   p(x) := 0
End for

Then, the computation of remaining depth values runs as follows. Sets Y and Z are working variables to manage the navigation in the graph. Number n is the current depth value and is increased during the navigation.

Y := S
Z := Ø
n := 0
While Y ≠ Ø do begin
   n := n + 1
   For all x ∈ Y do begin
     For all y ∈ α(ω$^{-1}$(x)) ∪ ω(α$^{-1}$(x)) do begin
       If p(y) = −1 then
         p(y) := n
         Z := Z ∪ {y}
       End if
     End for
   End for
   Y := Z
   Z := Ø
End while Once all the nodes of the graph of constraints have been visited, that is when the condition Y=Ø is met, all the node of the graph are associated with a depth value.

Figure 3:
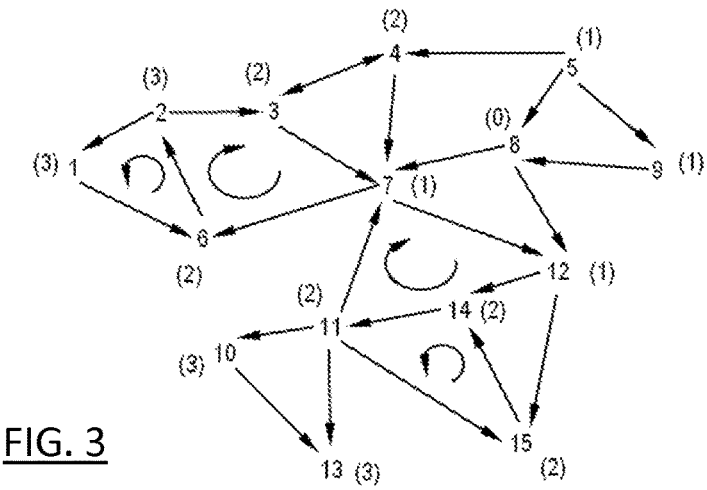
FIG. 3 shows an example of the graph of FIG. 2 wherein computed depth value of each node is displayed according to the user selection of node 8.

FIG. 3 illustrates the computing of depth values of the nodes of the graph of FIG. 2 according to the user selection of the geometry symbolized by node 8. In this example, there are no selected reference elements and the depth value of each node is written into parenthesis.

Once the symbolic depth value "−1" is a given and after that the user has selected the geometry symbolized (or represented) by node 8, the depth value "0" is given to the node 8. Then, adjacent nodes 5, 9, 12, 7 are traversed and depth value "1" is given. Then, for each node adjacent to nodes 5, 9, 12, 7 and having symbolic depth value "−1", the depth value "2" is set; these nodes are nodes 11, 6, 3, and 4 adjacent to node 7 and nodes 14 and 15 adjacent to node 12. Then, for each node adjacent to nodes 11, 6, 3, 4, 14 and 15 and having symbolic depth value "−1", the depth value "3" is set; these nodes are node 2 adjacent to node 3, node 1 adjacent to node 6, and nodes 10 and 13 adjacent to node 11. During the depth value computation, edge orientations are not taken into account for incidence searching.

Back to FIG. 1, at step S130, one or more antagonistic constraints are identified. An antagonistic constraint is represented by an oriented edge wherein the depth value of the start node is larger to the depth value of the end node. For an edge considered to be directed from x to y, the start node is the node x and the end node if the node y. Said otherwise, start node is the tail of the edge and end node is the head of the edge. Now, the set $A = \{u \in U; p(\omega(u)) < p(\alpha(u))\} \subset U$ of antagonistic arcs consists of all arcs such that the end node's depth value is smaller than the initial node's depth value. It is reminded that U symbolizes constraints.

Figure 4:
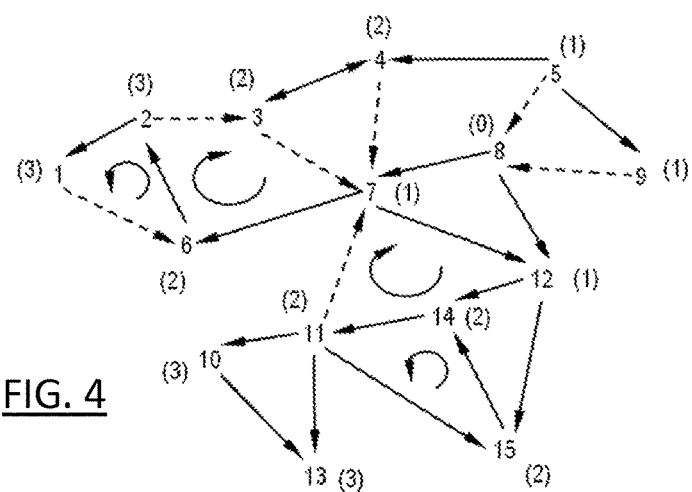
FIG. 4 shows an example of the graph of FIG. 2 wherein antagonistic constraints are represented with dotted lines.

FIG. 4 illustrates the identification of antagonistic constraints of the graph of FIG. 2. Antagonistic edges are represented by dotted lines. For example, the edge (3,7) is antagonistic because p(7)=1<2=p(3). As another example, the edge (9,8) is antagonistic as 1=p(9)>p(8)=0.

The identification of the antagonistic constraints of step S130 may be preceded by a step of determining the orientation of each edge of the graph from the node(s) having the lowest depth value to the node(s) having the highest depth value. Advantageously, this determination of the orientation of each makes easier the identification step S130. It is to be understood that the determination of the orientation is performed after the step of computing a depth value of each node of the graph.

An edge may connect two nodes that have the same depth value. Such an edge will not be identified as an antagonistic constraint and will be kept unchanged, that is, the edge is not identified as an antagonistic constraint at step S130 and is not reversed at step S140.

Back to FIG. 1, at step S140, the one or more antagonistic constraints identified at step S130 are reversed. Reversing an antagonistic constraint means that the orientation of the edge representing the constraint is inversed. As a result of step S140, the set A is empty, that is, the graph of constraints no more comprises edges such that the end node's depth value is smaller than the initial node's depth value.

Reversing antagonistic constraints advantageously allows to eliminate many cycles of the graph of constraints. The reversal is done as follows:

```
For all u ∈ A do begin
    z := α(u)
    α(u) := ω(u)
    ω(u) := z
End for
```

Figure 5:
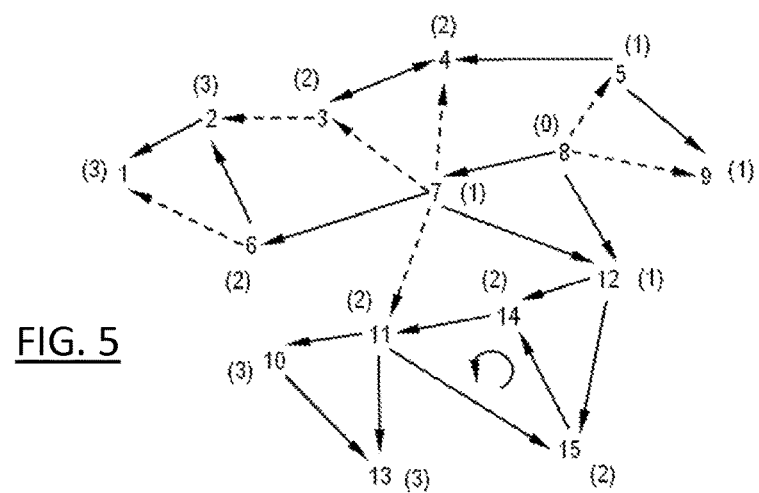
FIG. 5 shows an example of the graph of FIG. 2 wherein inversed antagonistic constraints are represented with dotted lines.

FIG. 5 shows the graph of FIG. 4 wherein antagonistic constraints have been reversed. The reoriented edges are still represented by dotted lines. For example, the edge (7,3) is not antagonistic because $p(7)=1<2=p(3)$. As another example, the edge (8,9) is not antagonistic as $0=p(8)<p(9)=1$. One notice that cycle 2-1-6, cycle 7-6-2-3 and cycle 7-12-14-11 disappeared, as oppose to cycle 15-14-11, which is kept. Cycle 15-14-11 is referred to as residual cycle.

Next, at step S150 of FIG. 1, the selected geometry is modified. The modification of the geometry may be performed as known in the art; e.g. the user modifies a parameter of the geometry.

Then, at step S160, the modification of the geometry is propagated to one or more other geometries of the industrial product. Propagating the modification of the geometry means that the geometries of the product are solved in accordance with the modification of selected geometry. Solving the geometries involves that the constraints between the geometries are solved to. In practice, the solving of the geometries is carried out by one or more solvers, as known in the art.

The solving is performed according to a sequence order that is defined by the computed depth values. Indeed, the reorientation of the edges representing antagonistic constraints yields a sequential solving of the constraints network. Hence, the sequence order is defined by depth values of the nodes computed at step S120.

The sequence order relies on groups of nodes that are obtained by grouping the nodes having the same depth value. Nodes with a depth value "0" form a group. Then, through a finite recurrence, nodes of a group of nodes having a depth value n+1 are solved altogether according to constraints connecting nodes of this group together and according to constraints oriented from (previously solved) depth n geometries toward depth n+1 geometries. Said otherwise, for a group of nodes having a depth value n+1, the geometries represented by the nodes of the group are solved according to constraints represented by edges connecting the nodes of the group, and the geometries represented by the nodes of the group are solved according to constraints oriented from nodes of a group of nodes having a depth value n toward nodes of the group of nodes having a depth value n+1. Thus, the sequential solving is done from the group of nodes having the smallest depth value to the one having the largest depth value.

It is to be understood that constraints connecting nodes labeled with the same depth value may feature cycles. Such residual cycles are not relevant because they do not contradict the modification intent defined by the user selection. A residual cycle can advantageously be solved by any dedicated method known in the art such reversing one constraint, iteration . . . .

It is also to be understood that, for the group of nodes having a depth value n, the constraints between geometries are solved and geometries are fixed when nodes of a group of nodes having a depth value n+1 are solved according to constraints oriented from depth n geometries toward depth n+1 geometries.

Figure 6:
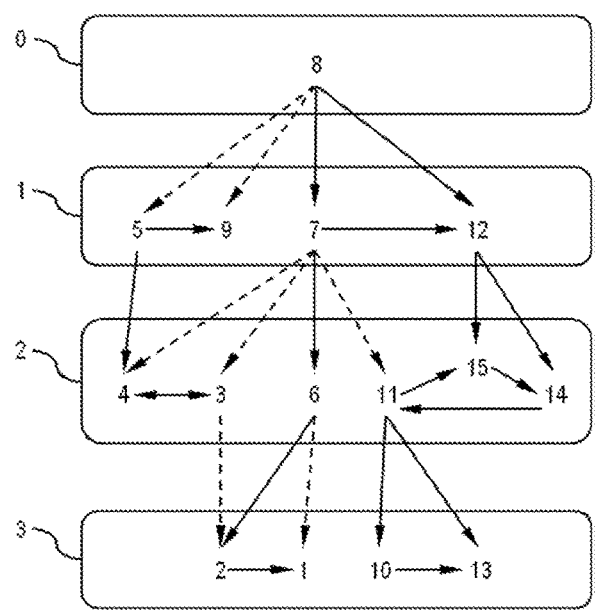
FIG. 6 shows an example of a solving of the geometries that is performed according to a sequence order defined by the computed depth values of FIG. 3.

Referring now to FIG. 6, the nodes of the graph depicted on FIG. 5 are grouped into four groups: node 8 belongs to the group of nodes of depth value "0" (also referred to as level "0"), nodes 5, 9, 7, 12 form the group of depth value "1" (also referred to as level "1"), nodes 4, 3, 6, 11, 15, 14 form the group of depth value "2" (also referred to as level "2"), and nodes 2, 1, 10, 13 form the group of depth value "3" (also referred to as level "3"). For clarity, reoriented arcs are dotted lines. This example features the residual cycle 15-14-11 occurring at the group of depth value "2".

The first group to be solved is the group of level "1": geometries represented by nodes 5, 9, 7, 12 are solved altogether according to constraints oriented from node 8 toward nodes 5, 9, 7, 12 and considering that the geometry represented by node 8 is fixed The second group to be solved is the group of level "2": geometries represented by nodes 4, 3, 1, 11, 15, 14 are solved altogether according to constraints oriented from nodes 5, 9, 7, 1, being understood that the geometries of group of level 1 are solved (and therefore they are fixed). Similarly, the level "3" is solved.

Hence, the knowledge of two consecutive levels n and n+1 allows to solve the geometries represented by nodes of the group of nodes having a depth value n+1. This advantageously makes easier the implementation of the solver. In addition, less computing resource are required for propagating the modification of the geometries as less data need are involved for solving of a group of level n+1.

Once geometries of each group have been solved, the propagation of the modification is considered as being carried out. At this step of the method, the modification of the selected geometry has been propagated across constraints network that is oriented in accordance with the design intent. Furthermore, orientations of edges are computed in such a way that reference elements (if any) are not modified.

At step S170, after the modification is done, original orientations of the identified antagonistic constraints may be restored. The antagonistic constraints thus return to their originally state. This advantageously avoids any degradation of the industrial product: the original design intent is preserved.

Hence, after step S170 is carried out, the designer can perform a new selection of geometrical elements, running another reorientation process according to said new selection. Hence, for each geometry selection, the user can freely modify the selected geometry, while preserving the design intent of the product. Free modification of the geometries of the product is made possible because the method deals with cycles of oriented constraints unintentionally created by the designer, e.g. when using curves and surfaces styling workbench. Instead of evaluating constraints of cycle one by one in the creation order, which generally yields unsatisfactory solution, cycles are broken by reorienting constraints, which advantageously provides a natural behavior by taking the instantaneous design intent into account and the typology of cycles to be broken versus residual cycles.

FIGS. 7 to 12 show an example of a typical three-dimensional network of curves for a car body preliminary design. The focus is given on curves 1 to 7. The geometries (that is, the curves 1 to 7) are connected together through geometrical constraints, the orientations of which are set by selection orders at creation step of the preliminary design of this industrial product by the original designer. It is to be understood that the network of geometries may be used for designing any industrial product such as, but not limited to, machinery, instrument, equipment, appliance, apparel, fabrics . . . .

Figure 7:
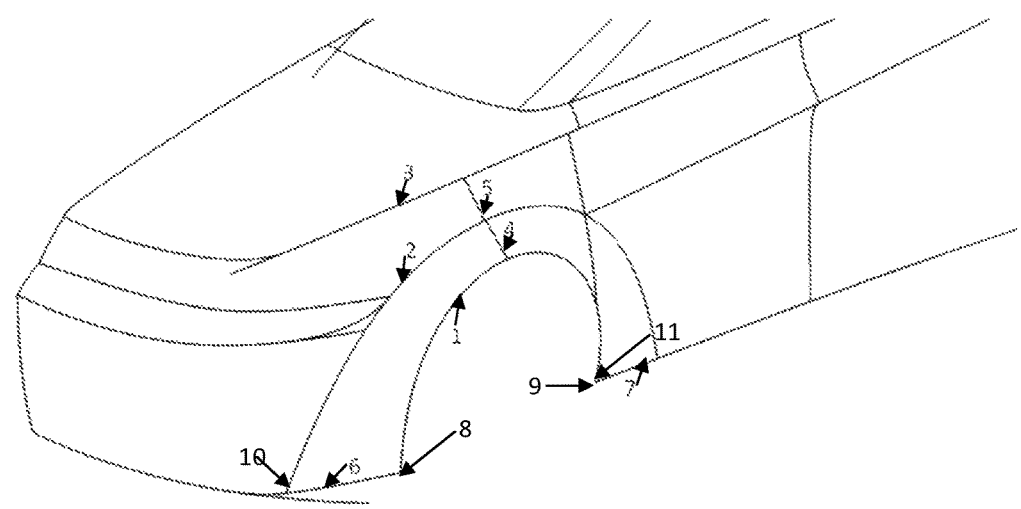
FIG. 7 shows an example of a three-dimensional network of geometries connected together through geometrical constraints for a car body preliminary design.
Figure 8:
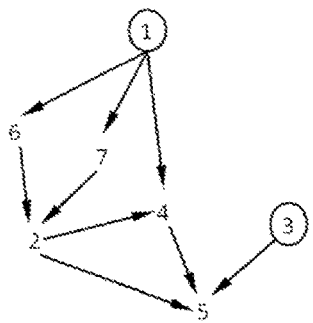
FIG. 8 shows an example of the graph of constraints of the three-dimensional network of geometries of FIG. 7.

Curves 1 to 7 of FIG. 7 are connected according to the graph of constraints of FIG. 8. Curves 1 and 3 are reference elements and are represented in the graph by circled nodes. Curves 1 and 3 cannot be modified. End points of curves 6 and 7 are shared with end points 8, 9 of curve 1. End points 10, 11 of curve 2 are respectively constrained on curve 6 and curve 7. End points of curve 4 are respectively constrained on curve 1 and curve 2. End points of curve 5 are respectively constrained on curve 2 and curve 3. Finally, end points of curve 5 lying on curve 2 is coincident with the end point of curve 4 lying on curve 2, and, at this point, the connection between curve 4 and curve 5 is curvature continuous.

Figure 9:
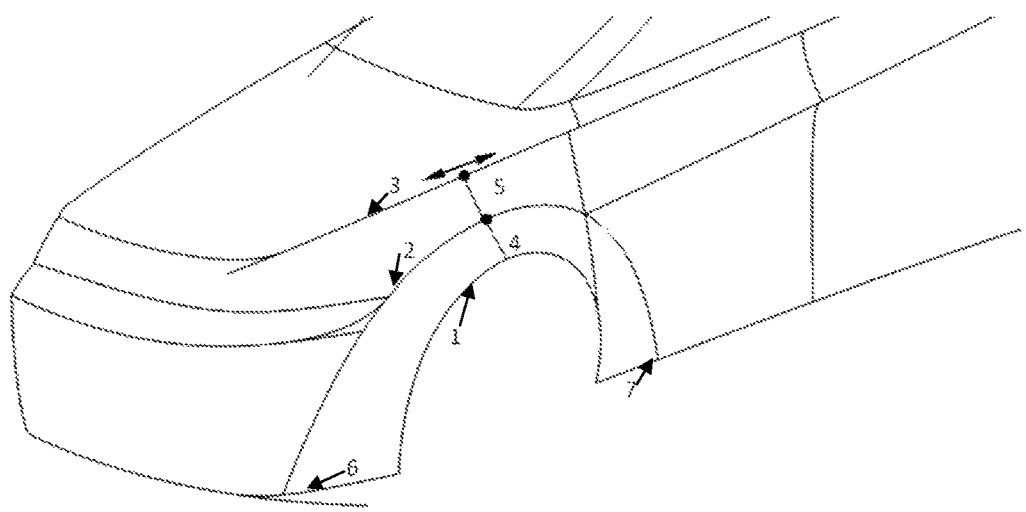
FIG. 9 shows the three-dimensional network of geometries of FIG. 7 wherein a double arrow illustrates an end point of curve 5 lying on curve 3 that can be moved by the designer without modifying the curve 3.

The orientation of the constraints shown on FIG. 8 allows the designer to slide the end point of curve 5 lying on curve 3 without modifying curve 3, as illustrated by the double arrow in FIG. 9. The end point of curve 5 lying on curve 4 cannot be moved by changing curve 5 because this end point is shared with curve 4, which is a master element of curve 5, as illustrated in FIG. 9.

Figure 10:
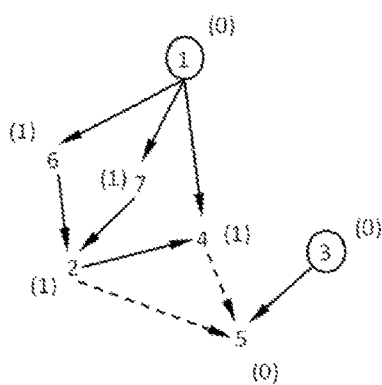
FIG. 10 shows antagonistic constraints represented with dotted lines of the graph of FIG. 8.

FIG. 10 shows the graph of FIG. 8 on which depth values of the nodes have been computed and antagonistic constraints identified are represented with dotted lines. One notices that curve 1 and curve 3 (represented in the graph by circled nodes) are reference elements and therefore have a "0" depth value. The curve 5 has also a "0" depth value because this is the geometry selected by the designer. Curves 1, 3 and 5 belong to the same group level"0". In this example, there is an oriented constraint starting from the node 3 and ending at the node 5: this constraint is therefore solved when solving geometries according to a sequence order that is defined by the computed depth values.

Figure 11:
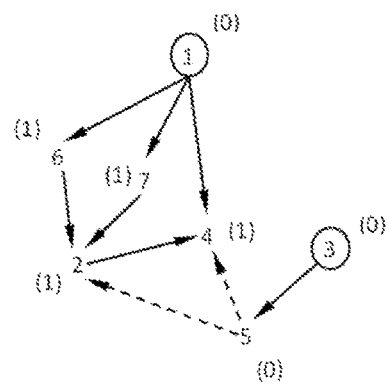
FIG. 11 shows reversed antagonistic constraints of FIG. 8.
Figure 12:
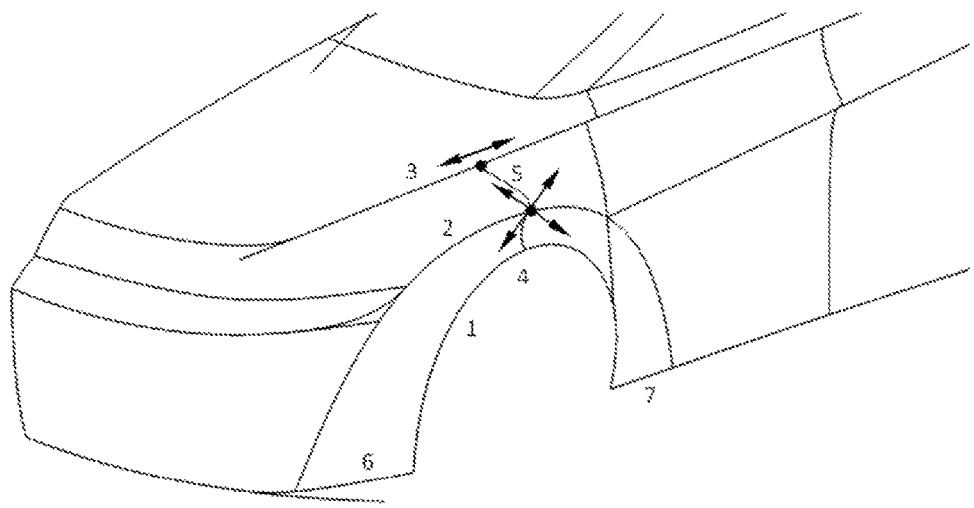
FIG. 12 shows the three-dimensional network of geometries of FIG. 7 wherein the end point of curve 5 lying on curve 2 is allowed to be moved by the designer.

FIG. 11 shows the graph of FIG. 10 on which the antagonistic constraints have been reversed. From now, the designer can freely modify curve 5 as antagonistic constraints have been reversed. From the geometrical point of view, the designer is allowed to slide the end point of curve 5 lying on curve 3 and to freely move the end point of curve 5 lying on curve 2, which may change the respective shapes of curve 2 and curve 4, as illustrated in FIG. 12. Hence, from now, it is possible for the designer to pilot curves 2 and 4 from the curve 5, while preserving curves 3 and 1. Once the modification of curve 5 has been performed, the original orientations of the reversed antagonistic constraints are restored, and therefore the modified product keeps the same constraints as the initial model. Robustness of the product is preserved.

The invention claimed is:

1. A computer-implemented method of designing an industrial product, the method comprising:
storing in a computer memory a three-dimensional (3D) computer-aided design (CAD) model of the industrial product, the 3D model formed of geometries and constraints between the geometries, the 3D model including a graph representation of the constraints, the graph representation stored in the memory, the graph representation having a constraints network including constraint orientations and the graph representation comprising nodes and edges, each node representing a given geometry of the industrial product and each edge representing a given constraint between two geometries of the industrial product;
receiving, by a processor, user selection of at least one geometry of the industrial product;
computing by the processor a depth value of each node of the graph from a node representing the at least one selected geometry, the depth value of said each node representing a distance of said each node from the node representing the at least one selected geometry when traversing the graph;
after the computing by the processor of the depth value of each node, identifying by the processor one or more constraints in the constraints network, each identified constraint being represented by an oriented edge from a respective start node to a respective end node, the respective start node being at one extremity of the oriented edge and having a computed depth value larger than the computed depth value of the respective end node, the respective end node being at another extremity of the oriented edge;
automatically reversing, by the processor, orientation of the identified one or more constraints in the constraints network;
receiving by the processor a modification of the at least one selected geometry; and
propagating by the processor the modification of the at least one selected geometry, according to a sequence order defined by the computed depth values, across the constraints network into the 3D model of the industrial product stored in the memory, the propagating resulting in a design of the industrial product.

2. The computer-implemented method of claim 1, wherein propagating the modification of the at least one selected geometry comprises:
solving the geometries of the industrial product according to one or more constraints of the graph representation of constraints in accordance with the modification of the at least one selected geometry, the solving being performed according to the sequence order that is defined by each computed depth value.

3. The computer-implemented method of claim 2, wherein nodes having a same depth value are grouped and the sequence order for solving the constraints between geometries comprises, for a group of nodes having a depth value n+1:
solving the geometries according to constraints represented by edges connecting the nodes of the group; and
solving the geometries according to constraints oriented from nodes of a group of nodes having a depth value n toward nodes of the group of nodes having a depth value n+1.

4. The computer-implemented method of claim 3, wherein constraints between geometries of the group of nodes having a depth value n are solved.

5. The computer-implemented method of claim 1, further comprising, after computing a depth value of each node of the graph representation:
determining, from the constraints network including constraint orientations, an orientation of each edge of the graph from a node having a lowest depth value to a node having a highest depth value.

6. The computer-implemented method of claim 1, wherein an edge connecting two nodes having a same depth value is kept unchanged.

7. The computer-implemented method of claim 1, further comprising after receiving user selection of at least one geometry of the product:
receiving user selection of at least one reference element, wherein a reference element is a geometry of the product that is kept unmodified during propagation.

8. The computer-implemented method of claim 7, wherein the at least one selected reference element and the at least one selected geometry have a same depth value that is a lowest depth value of the graph representation.

9. The computer-implemented method of claim 1, further comprising, after propagating the modification of the at least one selected geometry:
   restoring original orientations of the reversed one or more constraints.

10. The computer-implemented method of claim 1, wherein the geometries represented by the nodes are at least one of: a point, a line, a curve, a surface, a place, and a solid.

11. A non-transitory computer readable storage medium having recorded thereon a computer program comprising instructions for performing a computer-implemented method of design of an industrial product, the computer-implemented method comprising:
   storing in a computer memory a three-dimensional (3D) computer-aided design (CAD) model of the industrial product, the 3D model formed of geometries and constraints between the geometries, the 3D model including a graph representation of the constraints, the graph representation stored in the memory, the graph representation having a constraints network including constraint orientations and the graph representation comprising nodes and edges, each node representing a given geometry of the industrial product and each edge representing a given constraint between two geometries of the industrial product;
   receiving, by a processor, user selection of at least one geometry of the industrial product;
   computing by the processor a depth value of each node of the graph from a node representing the at least one selected geometry, the depth value of said each node representing a distance of said each node from the node representing the at least one selected geometry when traversing the graph;
   after the computing by the processor of the depth value of each node, identifying by the processor one or more constraints in the constraints network, each identified constraint being represented by an oriented edge from a respective start node to a respective end node, the respective start node being at one extremity of the oriented edge and having a computed depth value larger than the computed depth value of the respective end node, the respective end node being at another extremity of the oriented edge;
   automatically reversing, by the processor, orientation of the identified one or more constraints in the constraints network;
   receiving by the processor a modification of the at least one selected geometry; and
   propagating by the processor the modification of the at least one selected geometry, according to a sequence order defined by the computed depth values, across the constraints network into the 3D model of the industrial product stored in the memory, the propagating resulting in a design of the industrial product.

12. The non-transitory computer readable storage medium of claim 11 wherein, propagating the modification of the at least one selected geometry comprises:
   solving the geometries of the industrial product according to one or more constraints of the graph representation of constraints in accordance with the modification of the at least one selected geometry, the solving being performed according to the sequence order that is defined by each computed depth value.

13. The non-transitory computer readable storage medium of claim 12 wherein nodes having a same depth value are grouped and the sequence order for solving the constraints between geometries comprises, for a group of nodes having a depth value n+1:
   solving the geometries according to constraints represented by edges connecting the nodes of the group; and
   solving the geometries according to constraints oriented from nodes of a group of nodes having a depth value n toward nodes of the group of nodes having a depth value n+1.

14. The non-transitory computer readable storage medium of claim 13, wherein constraints between geometries of the group of nodes having a depth value n are solved.

15. The non-transitory computer readable storage medium of claim 11, wherein the computer-implemented method further comprises, after propagating the modification of the at least one selected geometry:
   restoring original orientations of the reversed one or more constraints.

16. A system comprising a processor coupled to a memory and a graphical user interface and suitable for performing a computer-implemented method of design of an industrial product, the method comprising:
   storing in a computer memory a three-dimensional (3D) computer-aided design (CAD) model of the industrial product, the 3D model formed of geometries and constraints between the geometries, the 3D model including a graph representation of the constraints, the graph representation stored in the memory, the graph representation having a constraints network including constraint orientations and the graph representation comprising nodes and edges, each node representing a given geometry of the industrial product and each edge representing a given constraint between two geometries of the industrial product;
   receiving, by the processor, user selection of at least one geometry of the industrial product;
   computing by the processor a depth value of each node of the graph from a node representing the at least one selected geometry, the depth value of said each node representing a distance of said each node from the node representing the at least one selected geometry when traversing the graph;
   after the computing by the processor of the depth value of each node, identifying by the processor one or more constraints in the constraints network, each identified constraint being represented by an oriented edge from a respective start node to a respective end node, the respective start node being at one extremity of the oriented edge and having a computed depth value larger than the computed depth value of the respective end node, the respective end node being at another extremity of the oriented edge;
   automatically reversing, by the processor, orientation of the identified one or more constraints in the constraints network;
   receiving by the processor a modification of the at least one selected geometry; and
   propagating by the processor the modification of the at least one selected geometry, according to a sequence order defined by the computed depth values, across the constraints network into the 3D model of the industrial product stored in the memory, the propagating resulting in a design of the industrial product.

17. The system of claim 16 wherein, propagating the modification of the at least one selected geometry comprises:
- solving the geometries of the industrial product according to one or more constraints of the graph representation of constraints in accordance with the modification of the at least one selected geometry, the solving being performed according to the sequence order that is defined by each computed depth value.

18. The system of claim 17, wherein nodes having a same depth value are grouped and the sequence order for solving the constraints between geometries comprises, for a group of nodes having a depth value n+1:
- solving the geometries according to constraints represented by edges connecting the nodes of the group; and
- solving the geometries according to constraints oriented from nodes of a group of nodes having a depth value n toward nodes of the group of nodes having a depth value n+1.

19. The system of claim 18, wherein constraints between geometries of the group of nodes having a depth value n are solved.

20. The system of claim 16, wherein the method further comprises, after propagating the modification of the at least one selected geometry:
- restoring original orientations of the reversed one or more constraints.

* * * * *